(12) United States Patent
Chen et al.

(10) Patent No.: US 8,208,575 B2
(45) Date of Patent: Jun. 26, 2012

(54) SPHERE DECODING METHOD APPLIED TO MULTI-INPUT MULTI-OUTPUT (MIMO) CHANNEL

(75) Inventors: Yen-Chih Chen, Hsinchu (TW); Tsung-Chun Cheng, Taipei County (TW); Der-Zheng Liu, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 392 days.

(21) Appl. No.: 12/562,351

(22) Filed: Sep. 18, 2009

(65) Prior Publication Data

US 2010/0074361 A1 Mar. 25, 2010

(30) Foreign Application Priority Data

Sep. 19, 2008 (TW) ................................ 97136187 A

(51) Int. Cl.
*H04L 1/02* (2006.01)
(52) U.S. Cl. ...................................................... 375/267
(58) Field of Classification Search ................... 375/267, 375/260, 299, 295, 316, 340, 347; 714/752; 370/203, 342; 455/78, 259, 260
See application file for complete search history.

(56) References Cited

U.S. PATENT DOCUMENTS

| | | | |
|---|---|---|---|
| 2005/0135498 A1* | 6/2005 | Yee | 375/267 |
| 2006/0188044 A1* | 8/2006 | Wang et al. | 375/347 |
| 2009/0232241 A1 | 9/2009 | Shabany et al. | |
| 2010/0054365 A1 | 3/2010 | Cheng et al. | |

OTHER PUBLICATIONS

Office Action issued in on Oct. 31, 2011, in related U.S. Appl. No. 12/562,305 (copy not provided).
Office Action issued in on Nov. 14, 2011, in related U.S. Appl. No. 12/562,332 (copy not provided).
Office Action issued in on Nov. 9, 2011, in related U.S. Appl. No. 12/562,422 (copy not provided).

* cited by examiner

*Primary Examiner* — Khai Tran
(74) *Attorney, Agent, or Firm* — Thomas, Kayden, Horstemeyer & Risley, LLP

(57) ABSTRACT

A sphere decoding method applied to a MIMO channel is provided. T signals transmitted via the MIMO channel are received. A first triangular matrix corresponding to a channel matrix is generated and mapped from the complex domain into the real domain to obtain a second triangular matrix. A first zero-forcing soft-output solution corresponding to a first estimation layer is found, and multiple preferred points P(1) are obtained. Multiple n-th zero-forcing soft-output solutions corresponding to an n-th estimation layer are obtained according to multiple preferred points P(n−1), and multiple preferred points P(n) are obtained according to PEDs of multiple n-th constellation points. Multiple 2T-th zero-forcing soft-output solutions are obtained according to the preferred points P(2T−1) and multiple preferred points P(2T) are obtained correspondingly. The preferred point P(2T) corresponding to the least PED is mapped from the real domain into the complex domain to generate an optimal solution of the T signals.

19 Claims, 2 Drawing Sheets

SPHERE DECODING METHOD APPLIED TO MULTI-INPUT MULTI-OUTPUT (MIMO) CHANNEL

This application claims the benefit of Taiwan application Serial No. 97136187, filed Sep. 19, 2008, the subject matter of which is incorporated herein by reference.

BACKGROUND OF THE INVENTION

1. Field of the Invention

The invention relates in general to a multi-input multi-output (MIMO) system, and more particularly to a sphere decoding method applied to a MIMO system, which is capable of reducing system complexity.

2. Description of the Related Art

Along with development of wireless communication technology, a wireless local area network has been improved from a single-input single-output (SISO) mode 802.11a/b/g to a MIMO mode 802.11n to meet the requirement of higher-speed data transmission. The MIMO technology uses multiple transmission antennas and reception antennas for respectively transmitting and receiving signals. Compared to the conventional SISO system, the MIMO system can provide multiple parallel data streams at the same time and the same frequency band, thereby the data transmission amount being increased by multiples.

The MIMO system has to efficiently use an equivalent orthogonal characteristic channel in space to transmit the multiple parallel streams in the same frequency band. However, the equivalent orthogonal characteristic channel is usually degraded to a different extent depending on geometric configuration and device features of the transmission and reception antennas and geometric and statistic features of the transmission paths. Therefore, signal detection is an essential subject in design of the MIMO system. In general, complexity of a signal estimation system is raised for reducing the error rate of signal reception.

In the present signal estimation methods, the maximum likelihood (ML) rule can provide the optimal receiving performance, but raises the complexity of the signal estimation system to a too-high extent, causing difficulty in hardware implementation. Therefore, a sphere decoding method is developed to simultaneously have a receiving performance close to that of the maximum likelihood method and suitable system complexity. The sphere decoding method includes the depth first search rule and the breadth first search rule. Both search rules can reach the receiving performance of the maximum likelihood rule by suitable parameter settings, but requires huge estimation complexity. Therefore, how to effectively reduce the estimation complexity of the sphere decoding method has become an important issue to be solved in the present design of the MIMO system.

SUMMARY OF THE INVENTION

The invention is directed to a sphere decoding method applied to a MIMO channel. By using a principle of transferring a triangular matrix from the complex domain into the real domain, the estimation complexity of the sphere decoding method can be effectively reduced; in the meanwhile the signal receiving performance of the system can be maintained.

In an embodiment of the present invention, a sphere decoding method applied to a MIMO channel is provided. T signals transmitted via the MIMO channel are received, wherein T is a positive integer and the MIMO channel is characterized by a channel matrix. A first triangular matrix corresponding to the channel matrix is generated and mapped from the complex domain into the real domain to obtain a second triangular matrix, wherein the second triangular matrix corresponds to a first estimation layer to a (2T)-th estimation layer. A first zero-forcing soft-output solution corresponding to the first estimation layer is found and a plurality of preferred points $P(1)$ of the first estimation layer are obtained. A plurality of n-th zero-forcing soft-output solutions corresponding to an n-th estimation layer are obtained according to a plurality of preferred points $P(n-1)$ of an $(n-1)$-th estimation layer, each of the n-th zero-forcing soft-output solutions corresponds to a plurality of n-th constellation points, and a plurality of preferred points $P(n)$ of the n-th estimation layer are obtained according to partial Euclidean distances (PEDs) corresponding to the n-th constellation points, n being a positive integer from 2 to $(2T-1)$. A plurality of 2T-th zero-forcing soft-output solutions corresponding to the 2T-th estimation layer are obtained according to the preferred points $P(2T-1)$ of the $(2T-1)$-th estimation layer and a plurality of preferred points $P(2T)$ of the 2T-th estimation layer are obtained correspondingly. The preferred point $P(2T)$ corresponding to the least PED is mapped from the real domain into the complex domain to generate an optimal solution corresponding to the T signals.

The invention will become apparent from the following detailed description of the preferred but non-limiting embodiments. The following description is made with reference to the accompanying drawings.

DETAILED DESCRIPTION OF THE INVENTION

The invention is directed to a sphere decoding method applied to a MIMO channel. By using a principle of transferring a triangular matrix from the complex domain to the real domain, a Q-R decomposition is performed in the complex domain and multiple preferred points corresponding to each estimation layer are obtained in the real domain. In this way, the estimation complexity of the sphere decoding method can be effectively reduced; in the meanwhile the signal receiving performance of the system can be maintained.

The sphere decoding method applied to a MIMO channel of the embodiment includes the following steps: a. receiving T signals transmitted via the MIMO channel, wherein T is a positive integer and the MIMO channel is characterized by a channel matrix; b. generating a first triangular matrix corresponding to the channel matrix and mapping the first triangular matrix from the complex domain into the real domain to obtain a second triangular matrix, wherein the second triangular matrix corresponds to a first estimation layer to a (2T)-th estimation layer; c. obtaining a first zero-forcing soft-output solution corresponding to the first estimation layer and obtaining a plurality of preferred points $P(1)$ of the first estimation layer; d. obtaining a plurality of n-th zero-forcing soft-output solutions corresponding to an n-th estimation layer according to a plurality of preferred points $P(n-1)$ of an $(n-1)$-th estimation layer, each of the n-th zero-forcing soft-output solutions corresponding to a plurality of n-th constellation points, and obtaining a plurality of preferred points P(n) of the n-th estimation layer according to PEDs corresponding to the n-th constellation points, n being a positive integer from 2 to (2T−1); and e. obtaining a plurality of 2T-th zero-forcing soft-output solutions corresponding to the 2T-th estimation layer according to the preferred points P(2T−1) of the (2T−1)-th estimation layer and correspondingly obtaining a plurality of preferred points P(2T) of the 2T-th estimation layer, and mapping the preferred point P(2T) corresponding to the least PED from the real domain into the complex domain to generate an optimal solution corresponding to the T signals.

Figure 1:
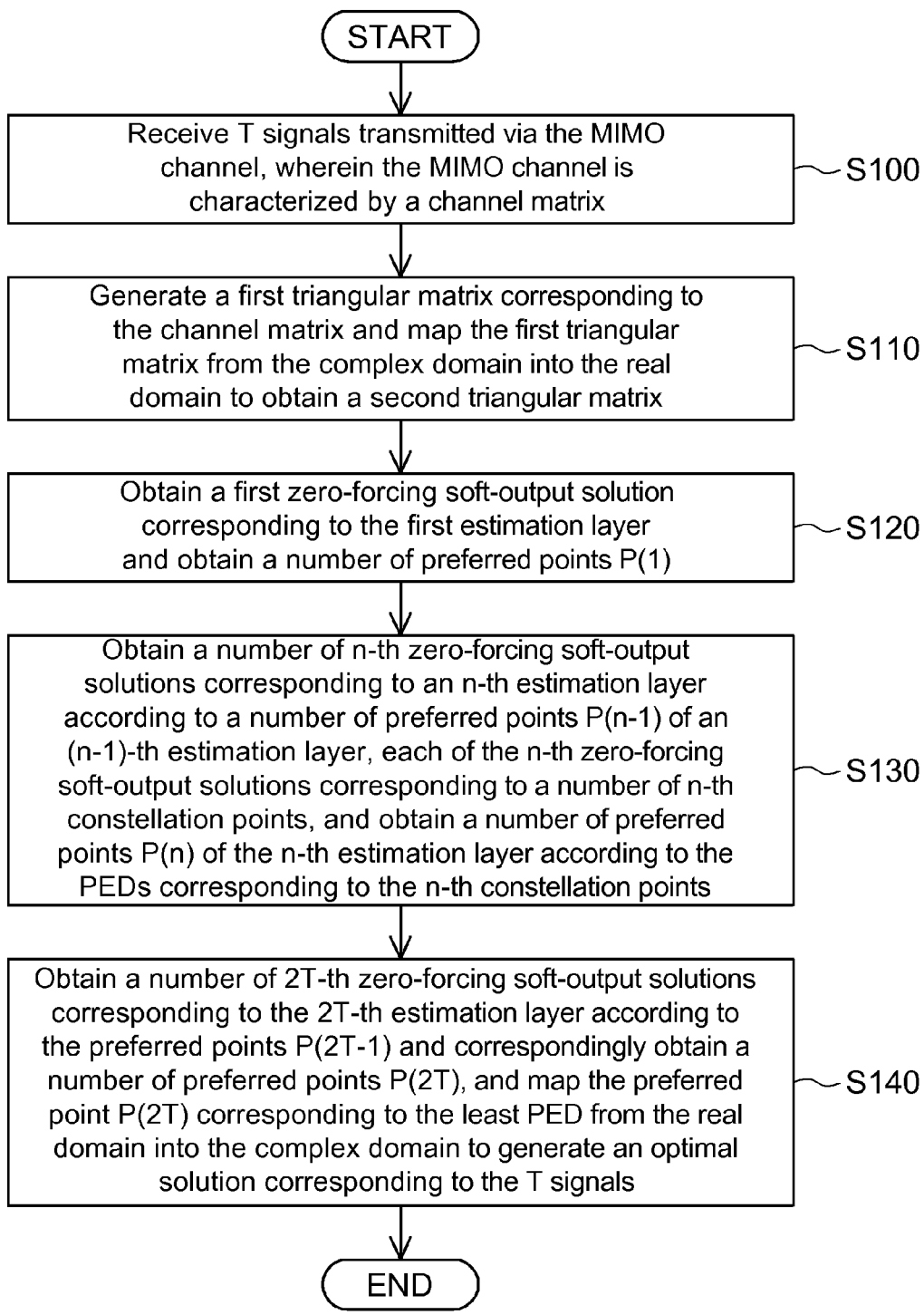
FIG. 1 is a flow chart of a sphere decoding method applied to a MIMO channel according to a preferred embodiment of the invention.

Detailed illustration will be given in the following description. Referring to FIG. 1, a flow chart of a sphere decoding method applied to a MIMO channel according to a preferred embodiment of the invention is shown. First, in step S100, T signals transmitted via a MIMO channel are received, wherein the MIMO channel is characterized by a channel matrix. Preferably, the T signals transmitted by T transmission antennas via the MIMO channel are received by using R' reception antennas, wherein R' is a positive integer. The channel matrix is a R'×T channel matrix H. The MIMO system represented in the time domain or the frequency domain can be defined as following:

$$r = Hx + n \quad (1)$$

Wherein the R'×1 matrix r represents the signals received by the R' reception antennas, the T×1 matrix x represents the signals transmitted by the T transmission antennas, and the R'×1 matrix n represents noise.

Next, in step S110, a Q-R decomposition is performed on the channel matrix H to generate a first triangular matrix and the first triangular matrix is mapped from the complex domain into the real domain to obtain a second triangular matrix, wherein the second triangular matrix corresponds to a first estimation layer to a (2T)-th estimation layer. By performing the above Q-R decomposition, it can be obtained:

$$H = QR$$

Wherein Q is a R'×T matrix and R is a T×T first triangular matrix. The first triangular matrix R is an upper triangular matrix for instance, but is not limited thereto. After the step S110, according to the equality formula (1), another equality formula of the MIMO system can be obtained as following:

$$y = Q^H r = Rx + Q^H n \quad (2)$$

Wherein the multiplication of $Q^H$ and Q is an unit matrix I. If the noise item $Q^H n$ in the equality formula (2) is omitted, and the first triangular matrix is an upper triangular matrix, the equality formula (2) can be expanded by a matrix form as followings:

$$\begin{bmatrix} y_1 \\ y_2 \\ y_3 \\ \vdots \\ y_T \end{bmatrix} = \begin{bmatrix} r_{11} & r_{12}^{(r)} + i \cdot r_{12}^{(i)} & r_{13}^{(r)} + i \cdot r_{13}^{(i)} & \cdots & r_{1T}^{(r)} + i \cdot r_{1T}^{(i)} \\ 0 & r_{22} & r_{23}^{(r)} + i \cdot r_{23}^{(i)} & \ddots & r_{2T}^{(r)} + i \cdot r_{2T}^{(i)} \\ 0 & 0 & r_{33} & \ddots & r_{3T}^{(r)} + i \cdot r_{3T}^{(i)} \\ \vdots & \vdots & \vdots & \ddots & \vdots \\ 0 & 0 & 0 & 0 & r_{TT} \end{bmatrix} \begin{bmatrix} x_1 \\ x_2 \\ x_3 \\ \vdots \\ x_T \end{bmatrix} \quad (3)$$

Wherein $y_p$, $r_{pq}^{(r)}$ and $r_{pq}^{(i)}$ are all known, $r_{pq}^{(r)}$ is a real part of $r_{pq}$, and $r_{pq}^{(i)}$ is an imaginary part of $r_{pq}$, p is an integer from 1 to T, q is an integer from 1 to T. Then, the first triangular matrix R is mapped from the complex domain into the real domain to obtain a second triangular matrix $\bar{R}$, wherein since the first triangular matrix R is an upper triangular matrix, the corresponding second triangular matrix $\bar{R}$ is also an upper triangular matrix. Consequently, the equality formula (3) can be transferred as following:

$$\begin{bmatrix} y_1^{(1)} \\ y_1^{(2)} \\ y_2^{(1)} \\ y_2^{(2)} \\ y_3^{(1)} \\ y_3^{(2)} \\ \vdots \\ y_T^{(1)} \\ y_T^{(2)} \end{bmatrix} = \quad (4)$$

$$\begin{bmatrix} r_{11} & 0 & c_{12}^{(1)} \cdot r_{12}^{(1)} & c_{12}^{(2)} \cdot r_{12}^{(2)} & c_{13}^{(1)} \cdot r_{13}^{(1)} & c_{13}^{(2)} \cdot r_{13}^{(2)} & \cdots & c_{1T}^{(1)} \cdot r_{1T}^{(1)} & c_{1T}^{(2)} \cdot r_{1T}^{(2)} \\ 0 & r_{11} & c_{12}^{(3)} \cdot r_{12}^{(2)} & c_{12}^{(4)} \cdot r_{12}^{(1)} & c_{13}^{(3)} \cdot r_{13}^{(2)} & c_{13}^{(4)} \cdot r_{13}^{(1)} & \cdots & c_{1T}^{(3)} \cdot r_{1T}^{(2)} & c_{1T}^{(4)} \cdot r_{1T}^{(1)} \\ 0 & 0 & r_{22} & 0 & c_{23}^{(1)} \cdot r_{23}^{(1)} & c_{23}^{(2)} \cdot r_{23}^{(2)} & \cdots & c_{2T}^{(1)} \cdot r_{2T}^{(1)} & c_{2T}^{(2)} \cdot r_{2T}^{(2)} \\ 0 & 0 & 0 & r_{22} & c_{23}^{(3)} \cdot r_{23}^{(2)} & c_{23}^{(4)} \cdot r_{23}^{(1)} & \cdots & c_{2T}^{(3)} \cdot r_{2T}^{(2)} & c_{2T}^{(4)} \cdot r_{2T}^{(1)} \\ 0 & 0 & 0 & 0 & r_{33} & 0 & \vdots & \vdots & \vdots \\ 0 & 0 & 0 & 0 & 0 & r_{33} & \cdots & \cdots & \cdots \\ \vdots & \vdots & \vdots & \vdots & \vdots & \vdots & \ddots & \vdots & \vdots \\ 0 & 0 & 0 & 0 & 0 & 0 & \cdots & r_{TT} & 0 \\ 0 & 0 & 0 & 0 & 0 & 0 & \cdots & 0 & r_{TT} \end{bmatrix} \begin{bmatrix} x_1^{(1)} \\ x_1^{(2)} \\ x_2^{(1)} \\ x_2^{(2)} \\ x_3^{(1)} \\ x_3^{(2)} \\ \vdots \\ x_T^{(1)} \\ x_T^{(2)} \end{bmatrix}$$

Wherein when the equality formulas (3) and (4) are expanded and compared, the coefficients $c_{pq}^{(1)}$ to $c_{pq}^{(4)}$ of the equality formula (4) can be obtained as following:

$$\begin{cases} c_{pq}^{(1)} = 1 \\ c_{pq}^{(2)} = -1 \\ c_{pq}^{(3)} = 1 \\ c_{pq}^{(4)} = 1 \end{cases} \text{ and } \begin{cases} r_{pq}^{(1)} = r_{pq}^{(r)} \\ r_{pq}^{(2)} = r_{pq}^{(i)} \end{cases}, \text{ if } x_q^{(1)} = x_q^{(r)} \text{ and } y_p^{(1)} = y_p^{(r)}, \text{ or}$$

$$\begin{cases} c_{pq}^{(1)} = -1 \\ c_{pq}^{(2)} = 1 \\ c_{pq}^{(3)} = 1 \\ c_{pq}^{(4)} = 1 \end{cases} \text{ and } \begin{cases} r_{pq}^{(1)} = r_{pq}^{(i)} \\ r_{pq}^{(2)} = r_{pq}^{(r)} \end{cases}, \text{ if } x_q^{(1)} = x_q^{(i)} \text{ and } y_p^{(1)} = y_p^{(r)}, \text{ or}$$

-continued $$\begin{cases} c_{pq}^{(1)} = 1 \\ c_{pq}^{(2)} = 1 \\ c_{pq}^{(3)} = 1 \\ c_{pq}^{(4)} = -1 \end{cases} \text{ and } \begin{cases} r_{pq}^{(1)} = r_{pq}^{(i)} \\ r_{pq}^{(2)} = r_{pq}^{(r)} \end{cases}, \text{ if } x_q^{(1)} = x_q^{(r)} \text{ and } y_p^{(1)} = y_p^{(i)}, \text{ or}$$

$$\begin{cases} c_{pq}^{(1)} = 1 \\ c_{pq}^{(2)} = 1 \\ c_{pq}^{(3)} = -1 \\ c_{pq}^{(4)} = 1 \end{cases} \text{ and } \begin{cases} r_{pq}^{(1)} = r_{pq}^{(r)} \\ r_{pq}^{(2)} = r_{pq}^{(i)} \end{cases}, \text{ if } x_q^{(1)} = x_q^{(r)} \text{ and } y_p^{(1)} = y_p^{(ir)},$$

Wherein the embodiment obtains the optimal solutions of $x_1^{(1)}$ to $x_T^{(2)}$ by using the known values $y_p^{(1)}$, $y_p^{(2)}$, $c_{pq}^{(1)}$ and $c_{pq}^{(2)}$.

In the equality formula (4), the equation $y_T^{(2)} = r_{TT} x_T^{(2)}$ corresponding to $x_T^{(2)}$ is defined as the first estimation layer, the equation $y_T^{(1)} = r_{TT} x_T^{(1)}$ corresponding to $x_T^{(1)}$ is defined as the second estimation layer, the equations corresponding to $x_{T-1}^{(2)}, x_{T-1}^{(1)}, \ldots, x_2^{(2)}, x_2^{(1)}$ are subsequently defined as the third to the $(2T-2)$-th estimation layers, the equation $y_1^{(2)} = c_{1T}^{(4)} \cdot r_{1T}^{(1)} x_T + \ldots + r_{11} x_1^{(2)}$ corresponding to $x_1^{(2)}$ is defined as the $(2T-1)$-th estimation layer, and the equation $y_1^{(1)} = c_{1T}^{(2)} \cdot r_{1T}^{(2)} x_T + \ldots + r_{11} x_1^{(1)}$ corresponding to $x_1^{(1)}$ is defined as the $2T$-th estimation layer, wherein each estimation layer includes M constellation points and M is a positive integer.

Following that, in step S120, a first zero-forcing soft-output solution corresponding to the value $x_T^{(2)}$ of the first estimation layer is obtained, and multiple preferred points P(1) of the first estimation layer are obtained according to the first zero-forcing soft-output solution. Corresponding to the first estimation layer, the equation $y_T^{(2)} = r_{TT} x_T^{(2)}$ is solved to obtain the first zero-forcing soft-output solution $y_T^{(2)}/r_{TT}$ of $x_T^{(2)}$, and the real part and imaginary part of the first zero-forcing soft-output solution $y_T^{(2)}/r_{TT}$ of $x_T^{(2)}$ may have floating points. The embodiment performs the calculation operation in the real domain, thereby obtaining multiple first constellation points closest to the first zero-forcing soft-output solution to be multiple preferred points P(1) according to one-dimensional distances between the constellation points and the first zero-forcing soft-output solution of $x_T^{(2)}$. Therefore, the preferred points P(1) of the first estimation layer can be obtained without having to substantially calculate the PEDs up to M times, thereby decreasing the system complexity.

Then, in step S130, multiple n-th zero-forcing soft-output solutions corresponding to the n-th estimation layer according to K preferred points P(n−1) of the (n−1)-th estimation layer, each of the n-th zero-forcing soft-output solution corresponding to multiple n-th constellation points, and multiple preferred points P(n) of the n-th estimation layer are obtained according to the PEDs corresponding to the n-th constellation points, wherein n is a positive integer from 2 to (2T−1) and K is smaller than M.

In step S130, when n is equal to 2, the equation $y_T^{(1)} = r_{TT} x_T^{(1)}$ is solved to obtain multiple second zero-forcing soft-output solutions of $x_T^{(1)}$ according to the preferred points P(1) of the first estimation layer. Because the calculation operation is performed in the real domain, according to one-dimensional distances between multiple constellation points and the second zero-forcing soft-output solutions of $x_T^{(1)}$, multiple second constellation points corresponding to each second zero-forcing soft-output solution of $x_T^{(1)}$ can be quickly obtained. Preferably, the second constellation points are close to the corresponding second zero-forcing soft-output solution of $x_T^{(1)}$. The number of the second constellation points corresponding to each second zero-forcing soft-output solution can be the same or different.

Afterwards, the PEDs corresponding to the second constellation points are obtained. Multiple preferred points P(2) of the second estimation layer are obtained from the second constellation points and transmitted to the third estimation layer. Any of the PEDs corresponding to the preferred points P(2) is smaller than the PED corresponding to any of the other second constellation points.

When n is smaller than or equal to (2T−2), the value of n is added by 1. Then, multiple n-th zero-forcing soft-output solutions corresponding to the n-th estimation layer are obtained according to the preferred points P(n−1) of the (n−1)-th estimation layer. Because the calculation operation is performed in the real domain, the n-th constellation points corresponding to each of the n-th zero-forcing soft-output solutions can be quickly obtained according to the one-dimensional distances. The number of the n-th constellation points corresponding to each n-th zero-forcing soft-output solution may be the same or different. Multiple preferred points P(n) of the n-th estimation layer can be obtained from the n-th constellation points. Any of the PEDs corresponding to the preferred points P(n) is smaller than the PED corresponding to any of the other n-th constellation points. Therefore, the K preferred points P(n) of the n-th estimation layer can be obtained without having to substantially calculate the PEDs up to K×M times, thereby decreasing the system complexity.

Afterwards, in step S140, the equation $y_1^{(1)} = c_{1T}^{(2)} \cdot r_{1T}^{(2)} x_T + \ldots + r_{11} x_1^{(1)}$ is solved to obtain multiple $2T$-th zero-forcing soft-output solutions corresponding to the $2T$-th estimation layer according to multiple preferred points P(2T−1) of the $(2T−1)$-th estimation layer. Because the calculation operation is performed in the real domain, according to one-dimensional distances from each $2T$-th zero-forcing soft-output solution of $x_1^{(1)}$, multiple $2T$-th constellation points closest to each $2T$-th zero-forcing soft-output solution of $x_1^{(1)}$ can be obtained. The $2T$-th constellation points are the preferred points P(2T). Then, the preferred point P(2T) corresponding to the least PED is mapped from the real domain into the complex domain according to a corresponding relationship between $x_p^{(1)}$, $x_p^{(2)}$ and $x_p^{(r)}$, $x_p^{(i)}$ to generate an optimal solution corresponding to the T signals, i.e. an optimal solution to the matrix x. Therefore, the preferred points P(2T) of the $2T$-th estimation layer can be obtained without having to substantially calculate the PEDs up to M times, thereby decreasing the system complexity.

In the following description, utilizing two reception antennas to receive two signals, outputted by two transmission antennas, via the MIMO channel are exemplified for illustration, but it is not limited thereto. When receiving the two signals via the MIMO channel, the MIMO system can be expanded in a matrix form as following:

$$\begin{bmatrix} y_1 \\ y_2 \end{bmatrix} = \begin{bmatrix} r_{11} & r_{12}^{(r)} + i \cdot r_{12}^{(i)} \\ 0 & r_{22} \end{bmatrix} \begin{bmatrix} x_1 \\ x_2 \end{bmatrix} \quad (5)$$

When $$\begin{cases} c_{pq}^{(1)} = 1 \\ c_{pq}^{(2)} = -1 \\ c_{pq}^{(3)} = 1 \\ c_{pq}^{(4)} = 1 \end{cases}$$

and $\begin{cases} r_{pq}^{(1)} = r_{pq}^{(r)} \\ r_{pq}^{(2)} = r_{pq}^{(i)} \end{cases}$, if $x_q^{(1)} = x_q^{(r)}$ and $y_p^{(1)} = y_p^{(r)}$, the equality formula (5) can be transferred as following:

$$\begin{bmatrix} y_1^{(r)} \\ y_1^{(i)} \\ y_2^{(r)} \\ y_2^{(i)} \end{bmatrix} = \begin{bmatrix} r_{11} & 0 & r_{12}^{(r)} & -r_{12}^{(i)} \\ 0 & r_{11} & r_{12}^{(i)} & r_{12}^{(r)} \\ 0 & 0 & r_{22} & 0 \\ 0 & 0 & 0 & r_{22} \end{bmatrix} \begin{bmatrix} x_1^{(r)} \\ x_1^{(i)} \\ x_2^{(r)} \\ x_2^{(i)} \end{bmatrix} \quad (6)$$

In the equality formula (6), the equation $y_2^{(i)}=r_{22}x_2^{(i)}$ corresponding to $x_2^{(i)}$ is defined as the first estimation layer, the equation $y_2^{(r)}=r_{22}x_2^{(r)}$ corresponding to $x_2^{(r)}$ is defined as the second estimation layer, the equation $y_1^{(i)}=r_{12}^{(r)}x_2^{(i)}+r_{12}^{(i)}x_2^{(r)}+r_{11}x_1^{(i)}$ corresponding to $x_1^{(i)}$ is defined as the third estimation layer, the equation $y_1^{(r)}=-r_{12}^{(i)}x_2^{(i)}+r_{12}^{(r)}x_2^{(r)}+r_{11}x_1^{(r)}$ corresponding to $x_1^{(r)}$ is defined as the fourth estimation layer. The equations corresponding to the first to the fourth estimation layers are subsequently solved to find the solution corresponding to the least PED to obtain $(x_1^{(r)}, x_1^{(i)}, x_2^{(r)}, x_2^{(i)})$, e.g. $(a_1, b_1, a_2, b_2)$. Finally, $(a_1, b_1, a_2, b_2)$ is mapped from the real domain into the complex domain to obtain that $(x_1, x_2)$ is equal to $(a_1+ib_1, a_2+ib_2)$, which is the optimal solution of the two signals.

The sphere decoding method applied to a MIMO channel disclosed by the above embodiment of the invention provides a simple principle of transferring a triangular matrix from the complex domain into the real domain and thus can perform the lower-complexity Q-R decomposition in the complex domain at the early stage of the process for obtaining the solution to the T signals. Besides, the first triangular matrix R is mapped from the complex domain into the real domain to be the second triangular matrix $\overline{R}$, thus the corresponding preferred points can be obtained by performing estimation on each estimation layer in the real domain at the later stage of the process for obtaining the solution to the T signals. Therefore, in the estimation of each estimation layer, only simple permutation should be done and only the PEDs corresponding to a smaller number of constellation points should be calculated, thereby effectively reducing the estimation complexity of the sphere decoding method.

Furthermore, if each estimation layer is estimated in the real domain, by incorporating the Schnorr & Euchner (SE) enumerating method, the original complex permutation performed in the complex domain can be further simplified to a simple permutation performed in the real domain, thereby greatly decreasing the enumerating complexity. Therefore, the reception terminal using the sphere decoding method of the MIMO channel of the embodiment can have advantages of high-performance signal transmission and decoding, approaching the reception performance of the maximum likelihood method and reducing system hardware complexity and chip area.

Figure 2:
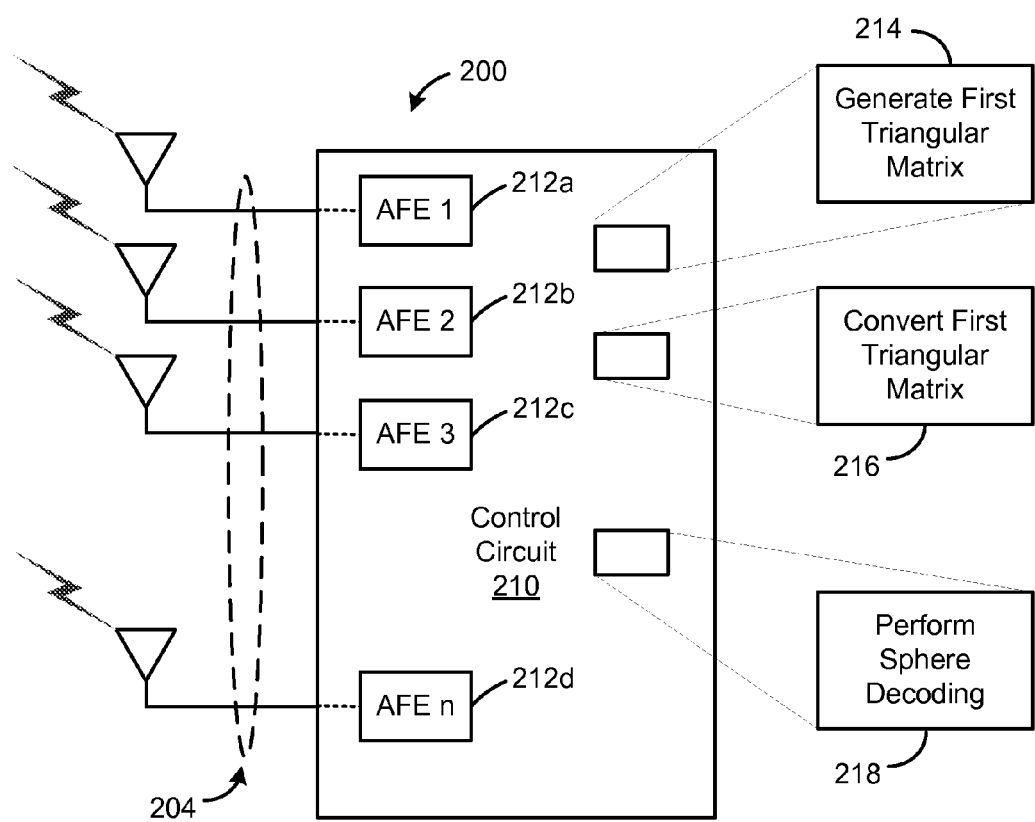
FIG. 2 is a block diagram of a MIMO receiver constructed in accordance with an embodiment of the invention.

In an embodiment, such as that illustrated in FIG. 2, the multiple-antenna (MIMO) receiver 200 using the sphere decoding method of the MIMO channel of the embodiment comprises a plurality of receiving routes 204 and the control circuit 210. Each of the receiving routes comprising a radio frequency and analog front-end circuit (212a, 212b, 212c, and 212d) for receiving a RF signal. As will be appreciated by persons skilled in the art, the receiving route may be implemented in a variety of ways, and therefore detailed illustrations and discussions of such circuitry need not be described herein. The control circuit 210 is used to perform the sphere decoding method according to this invention, wherein the control circuit can be implemented in hardware, software, firmware or a combination of hardware and software. The control circuit is configured to generate (using logic 214) a first triangular matrix corresponding to a MIMO channel matrix corresponding to the MIMO channel, to convert (using logic 216) the first triangular matrix from a complex domain into a real domain to obtain a second triangular matrix, and to perform (using logic 218) a sphere decoding method on the second triangular matrix to generate a signal detection solution. The control circuit further converts the signal detection solution from the real domain into the complex domain to generate a complex domain solution.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method executed in a non-transitory multi-input multi-output (MIMO) receiver applied to a MIMO channel, comprising:
    receiving by the MIMO receiver T signals transmitted via the MIMO channel and generating a first triangular matrix corresponding to a channel matrix, wherein the MIMO channel is characterized by the channel matrix, and T is a positive integer;
    converting in the MIMO receiver the first triangular matrix from a complex domain into a real domain to obtain a second triangular matrix, wherein the second triangular matrix corresponds to a first estimation layer to a (2T)-th estimation layer;
    subsequently obtaining a plurality of zero-forcing soft-output solutions corresponding to the first to the (2T)-th estimation layers;
    obtaining a plurality of preferred points of the 2T-th estimation layer according to the zero-forcing soft-output solution of the 2T-th estimation layer; and
    mapping by the MIMO receiver the preferred point of the 2T-th estimation layer corresponding to the least partial Euclidean distance (PED) from the real domain into the complex domain to generate a solution corresponding to the T signals.

2. The method according to claim 1, wherein a Q-R decomposition is performed on the channel matrix to generate the first triangular matrix.

3. The method according to claim 1, wherein the first triangular matrix and the second triangular matrix are upper triangular matrixes.

4. The method according to claim 1, wherein the first estimation layer corresponds to elements in a 2T-th row of the second triangular matrix.

5. The method according to claim 1, wherein the first triangular matrix is represented by:

$$\begin{bmatrix} r_{11} & r_{12}^{(r)}+i\cdot r_{12}^{(i)} & r_{13}^{(r)}+i\cdot r_{13}^{(i)} & \cdots & r_{1T}^{(r)}+i\cdot r_{1T}^{(i)} \\ 0 & r_{22} & r_{23}^{(r)}+i\cdot r_{23}^{(i)} & \ddots & r_{2T}^{(r)}+i\cdot r_{2T}^{(i)} \\ 0 & 0 & r_{33} & \ddots & r_{3T}^{(r)}+i\cdot r_{3T}^{(i)} \\ \vdots & \vdots & & \ddots & \vdots \\ 0 & 0 & 0 & 0 & r_{(2T)(2T)} \end{bmatrix}$$

the second triangular matrix is represented by:

$$\begin{bmatrix} r_{11} & 0 & c_{12}^{(1)}\cdot r_{12}^{(1)} & c_{12}^{(2)}\cdot r_{12}^{(2)} & c_{13}^{(1)}\cdot r_{13}^{(1)} & c_{13}^{(2)}\cdot r_{13}^{(2)} & \cdots & c_{1T}^{(1)}\cdot r_{1T}^{(1)} & c_{1T}^{(2)}\cdot r_{1T}^{(2)} \\ 0 & r_{11} & c_{12}^{(3)}\cdot r_{12}^{(2)} & c_{12}^{(4)}\cdot r_{12}^{(1)} & c_{13}^{(3)}\cdot r_{13}^{(2)} & c_{13}^{(4)}\cdot r_{13}^{(1)} & \cdots & c_{1T}^{(3)}\cdot r_{1T}^{(2)} & c_{1T}^{(4)}\cdot r_{1T}^{(1)} \\ 0 & 0 & r_{22} & 0 & c_{23}^{(1)}\cdot r_{23}^{(1)} & c_{23}^{(2)}\cdot r_{23}^{(2)} & \cdots & c_{2T}^{(1)}\cdot r_{2T}^{(1)} & c_{2T}^{(2)}\cdot r_{2T}^{(2)} \\ 0 & 0 & 0 & r_{22} & c_{23}^{(3)}\cdot r_{23}^{(2)} & c_{23}^{(4)}\cdot r_{23}^{(1)} & \cdots & c_{2T}^{(3)}\cdot r_{2T}^{(2)} & c_{2T}^{(4)}\cdot r_{2T}^{(1)} \\ 0 & 0 & 0 & 0 & r_{33} & 0 & \vdots & \vdots & \vdots \\ 0 & 0 & 0 & 0 & 0 & r_{33} & \cdots & \cdots & \cdots \\ \vdots & \vdots & \vdots & \vdots & \vdots & \vdots & \ddots & \vdots & \vdots \\ 0 & 0 & 0 & 0 & 0 & 0 & \cdots & r_{TT} & 0 \\ 0 & 0 & 0 & 0 & 0 & 0 & \cdots & 0 & r_{TT} \end{bmatrix}$$

wherein $$\begin{cases} c_{pq}^{(1)}=1 \\ c_{pq}^{(2)}=-1 \\ c_{pq}^{(3)}=1 \\ c_{pq}^{(4)}=1 \end{cases} \text{ and } \begin{cases} r_{pq}^{(1)}=r_{pq}^{(r)} \\ r_{pq}^{(2)}=r_{pq}^{(i)} \end{cases}, \text{ or}$$

$$\begin{cases} c_{pq}^{(1)}=-1 \\ c_{pq}^{(2)}=1 \\ c_{pq}^{(3)}=1 \\ c_{pq}^{(4)}=1 \end{cases} \text{ and } \begin{cases} r_{pq}^{(1)}=r_{pq}^{(i)} \\ r_{pq}^{(2)}=r_{pq}^{(r)} \end{cases}, \text{ or}$$

$$\begin{cases} c_{pq}^{(1)}=1 \\ c_{pq}^{(2)}=1 \\ c_{pq}^{(3)}=1 \\ c_{pq}^{(4)}=-1 \end{cases} \text{ and } \begin{cases} r_{pq}^{(1)}=r_{pq}^{(i)} \\ r_{pq}^{(2)}=r_{pq}^{(r)} \end{cases}, \text{ or}$$

$$\begin{cases} c_{pq}^{(1)}=1 \\ c_{pq}^{(2)}=1 \\ c_{pq}^{(3)}=-1 \\ c_{pq}^{(4)}=1 \end{cases} \text{ and } \begin{cases} r_{pq}^{(1)}=r_{pq}^{(r)} \\ r_{pq}^{(2)}=r_{pq}^{(i)} \end{cases},$$

p is a positive integer from 1 to T, and q is a positive integer from 1 to T.

6. The method according to claim 1, wherein each of the n-th zero-forcing soft-output solutions corresponding to a plurality of n-th constellation points, and the preferred points P(n) of the n-th estimation layer is obtained according to the least partial Euclidean distance (PED) corresponding to the n-th constellation points.

7. The method according to claim 1, wherein each estimation layer is estimated in the real domain, by incorporating a Schnorr & Euchner (SE) enumerating method.

8. A multi-input multi-output (MIMO) apparatus, comprising:
a plurality of receiving routes configured to receive T received signals transmitted via a MIMO channel; and
a control circuit configured to generate a first triangular matrix corresponding to a MIMO channel matrix corresponding to the MIMO channel, to convert the first triangular matrix from a complex domain into a real domain to obtain a second triangular matrix, and to perform a sphere decoding method on the second triangular matrix to generate a signal detection solution.

9. The apparatus of claim 8, wherein the second triangular matrix corresponding to a first estimation layer to a (2T)-th estimation layer, and the control circuit converts the preferred point of the 2T-th estimation layer from the real domain into the complex domain to generate the signal detection solution.

10. The apparatus of claim 8, wherein, the control circuit obtains a plurality of zero-forcing soft-output solutions corresponding to the first to the (2T)-th estimation layers, obtains the preferred point of the 2T-th estimation layer according to the zero-forcing soft-output solutions of the 2T-th estimation layer.

11. The apparatus of claim 9, wherein the control circuit uses a Schnorr & Euchner (SE) enumerating method to estimate each estimation layer.

12. The apparatus of claim 8, wherein the control circuit performs a Q-R decomposition on the channel matrix to generate the first triangular matrix.

13. The apparatus of claim 8, wherein the first triangular matrix and the second triangular matrix are upper triangular matrixes.

14. The apparatus of claim 9, wherein the first estimation layer corresponds to elements in a 2T-th row of the second triangular matrix.

15. The apparatus of claim 9, wherein the control circuit converts the signal detection solution from the real domain into the complex domain to generate a complex domain solution.

16. A multi-input multi-output (MIMO) signal detection method executed in a MIMO nontransitory MIMO apparatus, comprising:
receiving by the MIMO apparatus T signals transmitted via a plurality of channels and generating a first triangular matrix corresponding to a channel matrix, wherein the plurality of channels are characterized by the channel matrix, and T is a positive integer;
converting by the MIMO apparatus the first triangular matrix from a complex domain into a real domain to obtain a second triangular matrix; and
performing by the MIMO apparatus a sphere decoding method on the second triangular matrix to generate a signal detection solution.

17. The method of claim 16, further comprising:
converting the signal detection solution from the real domain into the complex domain to generate a complex domain solution.

18. The method of claim 16, wherein, wherein the second triangular matrix corresponds to a first estimation layer to a (2T)-th estimation layer, each estimation layer is estimated in the real domain, by incorporating a Schnorr & Euchner (SE) enumerating method.

19. The method of claim 16, wherein the first triangular matrix and the second triangular matrix are upper triangular matrixes.

* * * * *